United States Patent [19]
Alley

[11] Patent Number: 5,996,270
[45] Date of Patent: Dec. 7, 1999

[54] REEL SEAT WITH MACHINABLE CORE

[76] Inventor: F. William Alley, Gebbie Rd., Greensboro, Vt. 05841

[21] Appl. No.: 09/131,296

[22] Filed: Aug. 10, 1998

[51] Int. Cl.$^6$ .................................................. A01K 87/06
[52] U.S. Cl. ........................... 43/22; 43/4; 43/20; 43/18.1
[58] Field of Search .................................. 43/4, 18.1, 20, 43/22

[56] References Cited

U.S. PATENT DOCUMENTS

| | | | |
|---|---|---|---|
| 3,175,321 | 3/1965 | Stephens | 43/22 |
| 3,310,904 | 3/1967 | Binvignat | 43/22 |
| 4,083,141 | 4/1978 | Shedd et al. | 43/22 |
| 4,432,155 | 2/1984 | Miller | 43/22 |
| 4,702,032 | 10/1987 | Ohmura | 43/22 |
| 4,864,764 | 9/1989 | Yamato | 43/22 |
| 4,916,848 | 4/1990 | Childre | 43/23 |
| 5,088,225 | 2/1992 | Yamamoto | 43/22 |
| 5,288,359 | 2/1994 | Stobbie, IV et al. | 156/294 |
| 5,481,820 | 1/1996 | Ohmura | 43/22 |

*Primary Examiner*—Michael J Carone
*Assistant Examiner*—Son T. Nguyen
*Attorney, Agent, or Firm*—Wall Marjama Bilinski & Burr

[57] ABSTRACT

A reel seat for a fishing rod, including a frangible outer longitudinal member adapted to receive the foot of a reel and an inner longitudinal member adapted to receive a portion of a rod body. The frangible outer longitudinal member has a bore extending axially therethrough from one end thereof. The inner longitudinal member is fixed within the bore of the frangible outer longitudinal member and has a bore, substantially coaxial with the bore of the frangible outer longitudinal member, extending from one axial end thereof. The inner longitudinal member has a machinability that is greater than the machinability of the frangible outer longitudinal member to allow easy diametrical enlargement of the bore formed through the inner longitudinal member. The same sized reel seat can be used with various fishing rods having different diameters due to the high machinability of the inner longitudinal member.

4 Claims, 1 Drawing Sheet

REEL SEAT WITH MACHINABLE CORE

BACKGROUND OF THE INVENTION

The present invention relates to a reel seat for a fishing rod and a method of making a reel seat for a fishing rod, wherein the reel seat has a highly machinable core.

The quality of fishing rods today runs the full spectrum from inexpensive, mass-produced versions that can be purchased at any large scale retail outlet chain, all the way to very expensive, hand-crafted versions available only through elite sporting magazines and specialized retail stores. Fly fishing rods are one example of such high-end version fishing rods.

The business of high-end fishing rods is expanding very rapidly, and one can expect to spend several hundreds of dollars for a high-quality, hand-crafted rod. The craftsmen of such rods usually purchase a variety of component parts separately, and then assemble the parts in a specific combination according to individual orders. A contributing factor to the cost of high-end fishing rods is the raw cost of the component parts. One of the component parts of a fly rod, for example, is the rod body, which comes in various diameters and lengths, depending upon the intended class of fish to be pursued. The rod body itself might very well cost several hundred dollars.

Another component of a fly rod, for example, is the reel seat, which is fixed to the rod body to provide a carrier for the reel. Depending upon the material of the reel seat, it, too, can be quite expensive. In relatively expensive fly rods, the material of the reel seat often consists of rare types of hardwoods or other exotic materials. In some instances it is the sentimental value of the material used to make the reel seat of a custom-made fly rod that makes this component of the fly rod irreplaceable. For example, a client may request a fly rod builder to use part of a family heirloom as the reel seat of a custom fly rod. As will be explained below, however, it is the use of non-customized, generic-sized reel seats that presents specific problems for rod builders.

An example of such a reel seat is shown in FIG. 1. The reel seat 1 is usually longitudinal in shape to match the profile of the rod body (not shown), and includes a bore 2 extending therethrough from one axial end of the reel seat to the other axial end thereof. A slot 3 is usually machined in the outer surface of the reel seat to receive the foot of a reel. The reel is held in place by hoods (not shown) in a known manner.

Non-customized reel seats are purchased by fly rod builders in bulk, and the diameter of the bore 2 in each reel seat typically is the same. However, the diameter of the rod body ultimately used with each reel seat may vary over a wide range. Accordingly, the manufacturer of reel seats usually forms the bore in each reel seat to a diameter that matches the median diameter rod body typically used with that particular reel seat size. The rod builder is then left with the task of insuring a good fit between the rod body and the bore of the reel seat in each specific rod.

If the bore of the reel seat is smaller than the outer diameter of the rod body, then the rod builder must enlarge the bore, usually by drilling with wood or metal drill bits. Due to the thin-walled nature of the reel seat and the frangible nature of the materials from which it is made, however, the drilling operation often cracks the reel seat, which must then be discarded. This happens relatively frequently, since most rod builders do not have the appropriate equipment (e.g., gun drills) to enlarge the thin-walled reel seat bore successfully. And, when the reel seats are made of expensive wood or other customized materials, this cracking problem can become quite expensive for the rod builder. Reel seat manufacturers can successfully bore the reel seats because (1) they have the appropriate equipment, and (2) they bore the reel seat from larger diameter stock material that is then machined (e.g., turned on a lathe) down to form the thin-walled final structure.

If the bore of the reel seat is larger than the outer diameter of the rod body, then the rod builder must apply adhesive tape or other filler material to a portion of the outer surface of the rod body that is to be received within the reel seat in order to take up slack between the rod body and the bore of the reel seat. However, it is difficult to achieve a tight bond between the rod body and the reel seat, as the tape becomes deformed or deteriorates over time. A good tight bond between the rod body and the reel seat is necessary to maintain alignment of the rod eyelets and the reel secured to the reel seat.

There has been a long-felt need in the fishing rod industry for an improved reel seat that can be used with rod bodies having different diameters without experiencing the problems discussed above. To date, however, no such reel seat has been available in the industry.

SUMMARY OF THE INVENTION

It is an object of the present invention to provide a reel seat that can be used with fishing rods having different diameters and still provide a good tight fit between the rod body and the inner bore of the reel seat without the need for delicate machining operations or interposed layers of adhesive tape.

More specifically, it is an object of the present invention to provide a reel seat for a fishing rod, comprising a frangible outer longitudinal member adapted for receiving the foot of a reel, and an inner longitudinal member for receiving a portion of a rod body. The frangible outer longitudinal member has a bore extending therethrough from one axial end thereof. The inner longitudinal member is disposed within the bore of the frangible outer longitudinal member. The inner longitudinal member also has a bore extending therethrough from one axial end thereof. The bore of the inner longitudinal member is coaxial with the bore of the frangible outer longitudinal member. The machinability of the inner longitudinal member is greater than that of the frangible outer longitudinal member so that the rod builder can easily adjust the diameter of the reel seat bore without the threat of cracking the frangible outer member.

Another object of the present invention is to provide a reel seat for a fishing rod that can be used on fishing rods having diameters ranging from X up to Y. The reel seat includes a frangible outer member adapted to receive the foot of a reel and an inner member adapted to receive a portion of a rod body. The frangible outer member has a first bore extending axially therethrough from one end thereof, and the first bore has a diameter substantially equal to Y. The inner member is disposed within the bore of the frangible outer member and has a second bore, substantially coaxial with the first bore, extending from one axial end thereof. The second bore has a diameter substantially equal to X. The machinability of the inner member is greater than that of the frangible outer member so as to allow easy diametrical enlargement of the second bore from X up to Y.

Yet another object of the present invention is to provide a method of making a reel seat that can be used on fishing rods having diameters ranging from X up to Y. The method includes the steps of: (1) providing a frangible outer member adapted for receiving the foot of a reel, the frangible outer member having a bore passing therethrough from one axial end thereof, the bore having a diameter substantially equal to Y; and (2) disposing an inner member in the bore of the frangible outer member, the inner member having a bore substantially coextensive with the bore in the frangible outer member and a diameter substantially equal to X. The inner member is made of a material that is more highly machinable than the material of the frangible outer member, such that the diameter of the bore formed in the inner member can be enlarged easily from X to Y.

As used herein, "machinable" and "machinability" refer to the ease by which the material can be machined (e.g., drilled, filed, and the like). For example, hardwood or bone is much less machinable than plastic or cork. Accordingly, one possible combination for the reel seat of the present invention is an outer member of hardwood and an inner member of cork. A preferred combination for fly rods is an outer member of wood and an inner member of closed-cell foam.

Depending upon the materials selected for the inner and outer members, the inner member can be fixed to the inner surface of the outer member by an adhesive. If cork is used as the inner member for a wood outer member, it is possible to interference fit the cork inner member in the bore of the wood outer member. The cork is much more machinable compared to the wood, and thus a rod builder would have no problem enlarging the bore in the cork inner member to fit larger rod diameters. And, to the extent any cracks occur in the inner cork member as a result of the boring operation, those cracks will be mitigated at the interface between the wood and cork, and will not propagate through the wood outer member.

Also as used herein, the term "frangible" refers to the propensity for cracking that materials typically used to form reel seats (e.g., wood, plastic, and the like) have when subjected to machining operations such as bore drilling. Metals typically used to form high-strength reel seats can usually be bore drilled without cracking, and thus would not be considered "frangible" in the context of this invention.

DETAILED DESCRIPTION OF THE PREFERRED EMBODIMENT

A preferred embodiment of the present invention will now be described with reference to FIG. 2, which is a perspective view of a reel seat 10 in accordance with the present invention.

Figure 1:
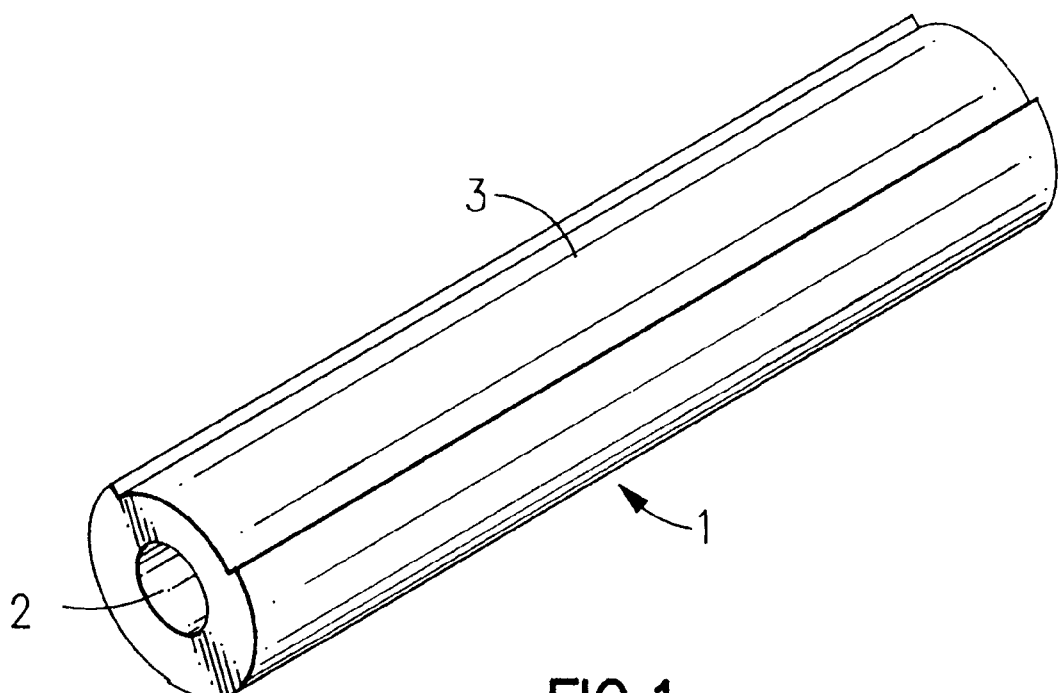
FIG. 1 is a perspective view of a reel seat in accordance with the prior art.
Figure 2:
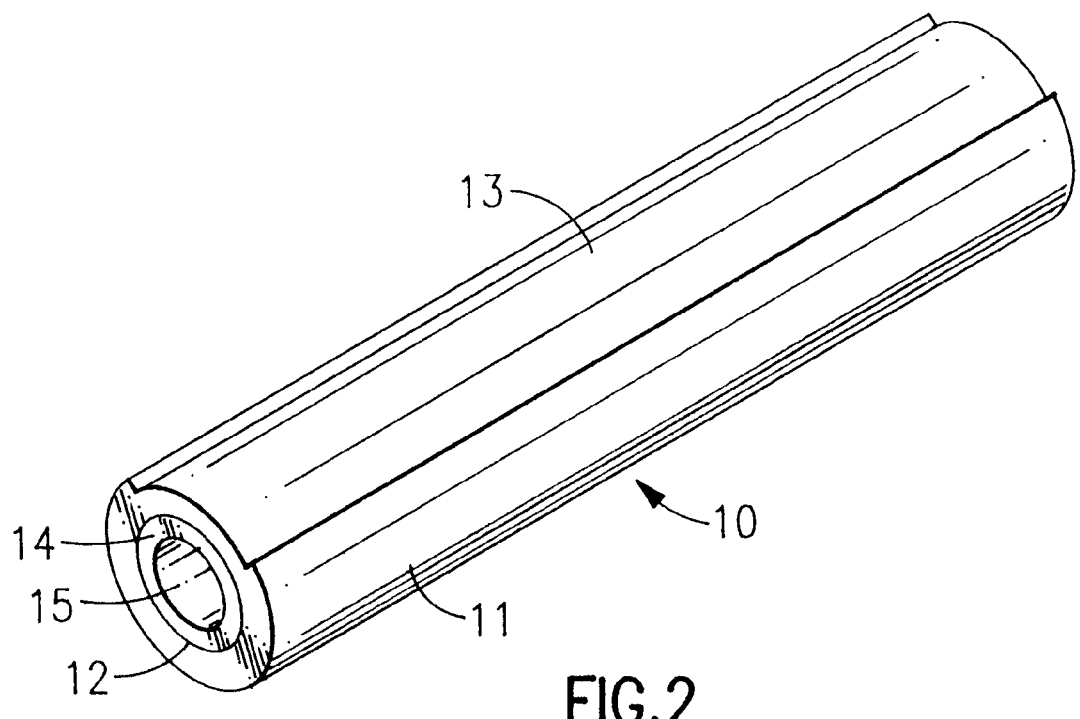
FIG. 2 is a perspective view of a reel seat in accordance with the present invention.

The reel seat in FIG. 2 is similar to that in FIG. 1, in that it includes a frangible outer longitudinal member 11 having a slot 13 machined in the outer surface thereof to receive the foot of a reel (not shown). A central bore 12 extends through the entire length of the outer member from one axial end thereof to the other axial end thereof. The material of the outer member 11 has a first, relatively low machinability. An inner longitudinal member 14 is fixed (e.g., by adhesive) within bore 12 of outer longitudinal member 11. The inner longitudinal member also has a central bore 15 extending therethrough from one axial end thereof to the other axial end thereof. As shown, bore 15 of inner longitudinal member 14 is coaxial with bore 12 of outer longitudinal member 11. A portion of a rod body (not shown) is received within bore 15 of inner longitudinal member 14.

The overall dimension of the reel seat can be selected to enable use of the reel seat with rods having a wide range of diameters. For example, a reel seat having an outer diameter of ¾" could be used with a rod having a diameter of ⅝" as well as with a rod having a diameter of ¼". In such a case, the diameter of bore 12 would be drilled to ⅝", while the diameter of bore 15 would be set to ¼". In this way, a rod builder could use the reel seat as received from the manufacturer for a ¼" diameter rod body, or could completely bore away inner member 14 to use the reel seat with a ⅝" diameter rod body. Any rod diameter between ¼" and ⅝" could also be used upon completion of the necessary machining of bore 15. Again, since the material of inner member 14 is more machinable than that of outer member 11, the rod builder can very easily adjust the inner diameter of bore 15 using standard shop equipment (e.g., a circular file) without concern over cracking the outer member.

A preferred method of making the reel seat shown in FIG. 2 will now be explained.

It is preferred to start with an oversized stock material. That is, if the outer diameter of the finished reel seat is to be ¾", then it is a good idea to start with a stock material having a diameter of about 1". A central hole is bored through the stock material from one end thereof to the other end thereof. A bore diameter of ⅝" is suitable for a reel seat of this size, and can accommodate most rod bodies.

Using the hole as a central reference point, the stock material is then placed on a lathe and machined to a predetermined, final diameter. A slot to receive the foot of a reel can be machined in the outer surface of the reel seat either before or after the reel seat is turned on the lathe to its final diameter. It is preferred, however, to form the slot before the reel seat is turned to its final diameter, as this sequence reduces the occurrence of cracks in the reel seat during formation of the slot.

A preformed stock material is selected to serve as the inner longitudinal member. The stock material is cut to match the length of the reel seat and is fixed in the inner bore of the reel seat. It is preferred that the stock material already contain a central hole passing therethrough, but such a hole could be formed after the inner member is fixed in place in the central bore of the outer member. In the specific case described above, it is preferred that the bore of the inner member have a diameter of ¼". This will allow for the use of "light" rod bodies. Again, however, the rod builder can enlarge the bore of the inner member all the way to the limit of the inner bore of the outer member. Accordingly, the reel seats in accordance with the present invention can be produced in bulk as "generic" sized reel seats, but can be easily customized by the rod builder to fit a wide array of rod bodies having diameters ranging from ¼" to ⅝" in the case described above.

The reel seat will be provided by the manufacturer basically in the form shown in FIG. 2. In the case of the specific embodiment discussed above, the diameter of bore 15 is ¼" and the diameter of bore 12 is ⅝". If the rod builder is assembling a rod using a ¼" diameter rod body, then the rod body would be inserted directly into bore 15 and the reel seat would be secured at the desired position along the length of the rod body. If, however, the rod builder is assembling a heavier rod, bore 15 must first be enlarged to match the outer diameter of the heavier rod body. This task is made much easier when using a reel seat in accordance with the present invention, due to the highly machineable nature of the inner member of the reel seat. In most cases, the inner member can be machined with a circular file or standard drill bit. Once the diameter of bore 15 is enlarged enough to accept the diameter of the rod body, the reel seat is secured to the rod body in the same manner as described above.

The present invention provides a significant improvement in the art of rod building, especially in the art of fly rod building, in that it virtually eliminates the chances of reel seat cracking during assembly of a fishing rod. Rod builders will no longer waste reel seats (because of cracking) when attempting to size the reel seat to a larger diameter rod body. The present invention also allows manufacturers to take more of a one-size-fits-all approach when making reel seats, due to the highly machineable nature of the inner member.

The materials used to make the frangible outer member can be any of those historically used to make reel seats. For example, the reel seat outer member can be made of hardwoods, hard plastics, bone, antler, and the like. Metals are excluded from the foregoing list as they can be drilled with relative ease without the concern over cracking. The material for the inner member likewise is not particularly limited, so long as it is more machinable than the material selected for the outer member. Examples of suitable materials for the inner member include closed-cell foam, cork, soft woods, soft machinable plastics, and the like.

While the present invention has been described with reference to preferred embodiments thereof, it will be understood by those skilled in the art that various modifications and the like could be made thereto without departing from the spirit and scope of the invention as defined in the appended claims. For example, although the outer longitudinal member of the preferred embodiment was formed by turning on a lathe, that member could be formed by any number of other known techniques, such as extrusion, casting, press-molding, and the like. Additionally, although the outer member is depicted as cylindrical in shape, any other shape could be employed. Further, although the bores of the inner and outer members have been described as passing through the entire length of the inner and outer members, it is possible that the bores will begin on one axial end and terminate before reaching the other axial end.

What is claimed is:

1. A method of making a reel seat that can be used on fishing rods having diameters ranging from X up to Y, comprising the steps of:

provinding a frangible outer member having an outer surface adapted for receiving the foot of a reel thereon, the frangible outer member having a bore passing therethrough from one axial end thereof, the bore having a diameter substantially equal to Y;

disposing an inner member in the bore of the frangible outer member, the inner member having a bore substantially coextensive with the bore of the frangible outer member and a diameter substantially equal to X, the inner member being made of a material that is more highly machinable than the material of the frangible outer member, such that the diameter of the bore formed in the inner member can be enlarged easily from X up to Y; and machining the inner member as necessary to change the diameter of the bore therethrough to accommodate a fishing rod having up to Y.

2. The method of claim 1, further comprising the step of fixing the inner member within the bore of the frangible outer member through an interposed adhesive.

3. The method of claim 1, wherein the bore formed in the frangible outer member extends through the entire axial length thereof.

4. The method of claim 3, wherein the bore formed in the inner member extends through the entire axial length thereof.

\* \* \* \* \*